United States Patent
Webb et al.

(10) Patent No.: US 8,046,777 B2
(45) Date of Patent: *Oct. 25, 2011

(54) CALLING OF LATE BOUND FUNCTIONS FROM AN EXTERNAL PROGRAM ENVIRONMENT

(75) Inventors: Peter Hartwell Webb, Newton, MA (US); Barry Simon, Sudbury, MA (US); Charles G. Nylander, Merrimack, NH (US); John Micco, Waltham, MA (US); Marc Ullman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1893 days.

This patent is subject to a terminal disclaimer.

(21) Appl. No.: 11/144,411

(22) Filed: Jun. 2, 2005

(65) Prior Publication Data

US 2006/0277526 A1 Dec. 7, 2006

(51) Int. Cl.
*G06F 3/00* (2006.01)
(52) U.S. Cl. .......................................... 719/328; 719/330
(58) Field of Classification Search .................. 719/328, 719/330
See application file for complete search history.

(56) References Cited

U.S. PATENT DOCUMENTS

| | | | |
|---|---|---|---|
| 5,381,547 A * | 1/1995 | Flug et al. ...................... | 719/331 |
| 5,828,843 A * | 10/1998 | Grimm et al. .................. | 709/228 |
| 6,026,238 A | 2/2000 | Bond et al. | |
| 6,041,179 A | 3/2000 | Bacon et al. | |
| 6,247,175 B1 | 6/2001 | Ledford et al. | |
| 6,442,752 B1 * | 8/2002 | Jennings et al. ............... | 717/162 |
| 6,799,320 B1 * | 9/2004 | Elvanoglu et al. ............. | 719/331 |
| 6,901,595 B2 * | 5/2005 | Mukundan et al. ............ | 719/316 |
| 7,000,238 B2 * | 2/2006 | Nadler et al. .................. | 719/330 |
| 7,100,153 B1 | 8/2006 | Ringseth et al. | |
| 7,171,311 B2 * | 1/2007 | Dai et al. ........................ | 702/19 |
| 7,324,972 B1 | 1/2008 | Oliver et al. | |
| 7,370,075 B2 * | 5/2008 | Farquharson et al. ........ | 709/203 |
| 2002/0078255 A1 | 6/2002 | Narayan | |
| 2004/0019883 A1 | 1/2004 | Banerjee et al. | |

FOREIGN PATENT DOCUMENTS

JP 06103075 * 4/1994

OTHER PUBLICATIONS

Udo Nink, Database Application Programming with Versioned Complex Object, Mar. 1997.*
International Preliminary Report on Patentability for Application No. PCT/US2006/021591, dated Dec. 6, 2007.
European Search Report for Application No. 06772051.6-221, dated Feb. 28, 2008.
Setiawan, Agus et al., "GridCrypt: High Performance Symmetric Key Cryptography Using Enterprise Grids," Proceedings of the 5th International Conference on Parallel and Distributed Computing, Applications and Technologies (2004).

* cited by examiner

Primary Examiner — Lechi Truong
(74) Attorney, Agent, or Firm — Nelson Mullins Riley & Scarborough LLP (57) ABSTRACT

The present invention is directed toward automatically integrating a late bound program language into an external environment. The external environment may be an early bound environment, a late bound environment or some combination thereof. Associated with the late bound program environment is a modular execution engine and an interface mechanism, wherein the interface mechanism is capable of expressing late bound semantics in a format compatible with the external environment.

54 Claims, 5 Drawing Sheets

CALLING OF LATE BOUND FUNCTIONS FROM AN EXTERNAL PROGRAM ENVIRONMENT

FIELD OF THE INVENTION

The present invention relates to applications and software components and more particularly to methods and systems for calling late bound functions from an early bound application.

BACKGROUND OF THE INVENTION

Binding a function call in an application entails replacing a symbolic address for the function with a real machine address. Thus, the binding determines which function (i.e. the section of code that implements the function) to execute at runtime. When binding occurs during compilation, it is "early bound." In contrast, when binding occurs at runtime, it is "late bound." Programming languages may generally be categorized as being either early bound or late bound.

The choice of function call binding time (i.e. early bound vs. late bound) is a trade-off between performance of the code at runtime (early binding is faster at runtime) and ease of programming for the programmer (late bound programs are easier to write). Currently, a programmer must decide what is more important: the time it takes for the programmer to write the program or the time it takes for the program to execute. Unfortunately, this is often a difficult choice to make. There is no mechanism in conventional systems to balance the trade-off effectively.

SUMMARY OF THE INVENTION

The present invention provides a method and system for integrating late bound program functions into an external program environment. The external program environment may be an early bound environment, a late bound environment, or some combination thereof.

In accordance with a first aspect of the present invention, a method is provided wherein a late bound application is integrated into an external program environment. A late bound program and a late bound environment are provided and subsequently examined to determine which late bound calls exist within the late bound program and environment that should be made available to the external environment. An interface is then generated, wherein the interface allows for the integration of the late bound function calls within the external program environment. The external environment used in practicing this invention may be a late bound environment, an early bound environment or some combination thereof.

In another aspect of the present invention a system for integrating a late bound program language into an external environment is provided, wherein the system comprises an external environment and a late bound program and program environment. The external environment can be a late bound program environment, and early bound program environment or some combination thereof. The late bound program environment contains a modular execution engine and an interface mechanism such that the interface mechanism allows for the expression of late bound semantics in an external environment compatible format.

In a further aspect of the present invention, a method for packaging executable late bound content into a re-distributable application for use with an external program environment is provided. The external environment can be a late bound program environment, an early bound program environment or some combination thereof. The method includes the steps of first examining the late bound content to determine which files in the late bound content represent a late bound application. A late bound modular execution engine is further provided, wherein the modular execution engine contains only those functions which are necessary to support the late bound application. Furthermore the modular execution engine is configured to execute only those functions which are necessary to support the late bound application.

In another aspect of the present invention, a network comprising a client and server is provided wherein the server is capable of executing a late bound program environment and an external program environment. Suitable external environments include, but are not limited to, late bound program environments, early bound program environments or some combination thereof. The client is in communication with the server through the network. An interface is generated such that the interface allows data exchange between the late bound program and program environment and the external program environment such that the late bound program application can be integrated into the external program environment.

In an alternate aspect of the present invention, a system for integrating a late bound application into an external environment is recited wherein a distribution server is utilized for providing information to a client device. Additionally, an interface mechanism is provided wherein the interface mechanism allows for the integration of the late bound function calls into the external program environment.

DETAILED DESCRIPTION OF THE INVENTION

The illustrative embodiment of the present invention provides a mechanism for applications existing within external program environments to invoke functions which exist in late bound languages. For the purposes of illustration, the following description will be in reference to the integration of late bound functions into early bound external program environments. Alternate external environments exists, including but not limited to those containing early bound languages, late bound languages or some combination thereof. In the present example, the integration of late bound function within an early bound environment allows a programmer to choose when to make the trade-off of execution time versus ease of coding. Thus, a programmer can use early bound function calls for performance critical portions of an application and use late bound function calls for functions that are difficult to program.

The integration of late bound function calls into an early bound programming environment provides a number of benefits in addition to providing the balancing of the trade-off described above. First, the integration provides early bound programming environments with a way to take advantage of the expressive power of late binding. Second, the integration enables early bound programming environments to bind an early bound function call to a set of one or more late bound function calls. Third, it provides a way for large legacy systems to incorporate more modern programming methods, such as found with late bound function calls.

In the alternative, late bound function integration into late bound program environments offers numerous benefits not readily recognized when utilizing late bound function integration into early bound languages. For example, most late bound program languages are specialized for operation within a specific problem domain. The LISP late bound language, for example, is best suited for the symbolic processing of lists of strings. In comparison, the late bound PROLOG programming language is suitable for theorem proving and logical inference problems. The late bound MATLAB programming language, in contrast, is suitable for operation within the numerical linear algebra domain. The above late bound program languages are used solely as illustrative examples of applicable late bound program environments for use with the present invention. This list is not definitive, as one skilled in the art will readily recognize the existence of numerous alternative late bound program environments applicable to the present invention.

The present invention, when integrating a late bound function call within a late bound environment, allows a user to form a program that combines calls to multiple late bound languages such that the most suitable language is used in solving the outstanding computing problem.

The illustrative embodiment will be described for illustrative purposes relative to a MATLAB® environment. Although the illustrative embodiment will be described relative to MATLAB®-based applications, the present invention may be applied to deploy and distribute applications generated in different programming and development environments, such as but not limited to Labview from National Instruments, Inc., LISP, or PROLOG.

MATLAB® is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN. MATLAB® provides application development tools including the MATLAB® Compiler. MATLAB® Builder for COM and MATLAB® Builder for Excel work in conjunction with the MATLAB® Compiler to automatically generate objects that execute in COM and Excel environments. The application development tools enable users to create and distribute MATLAB® applications and share MATLAB® work with colleagues who may use MATLAB® or other environments.

Figure 1:
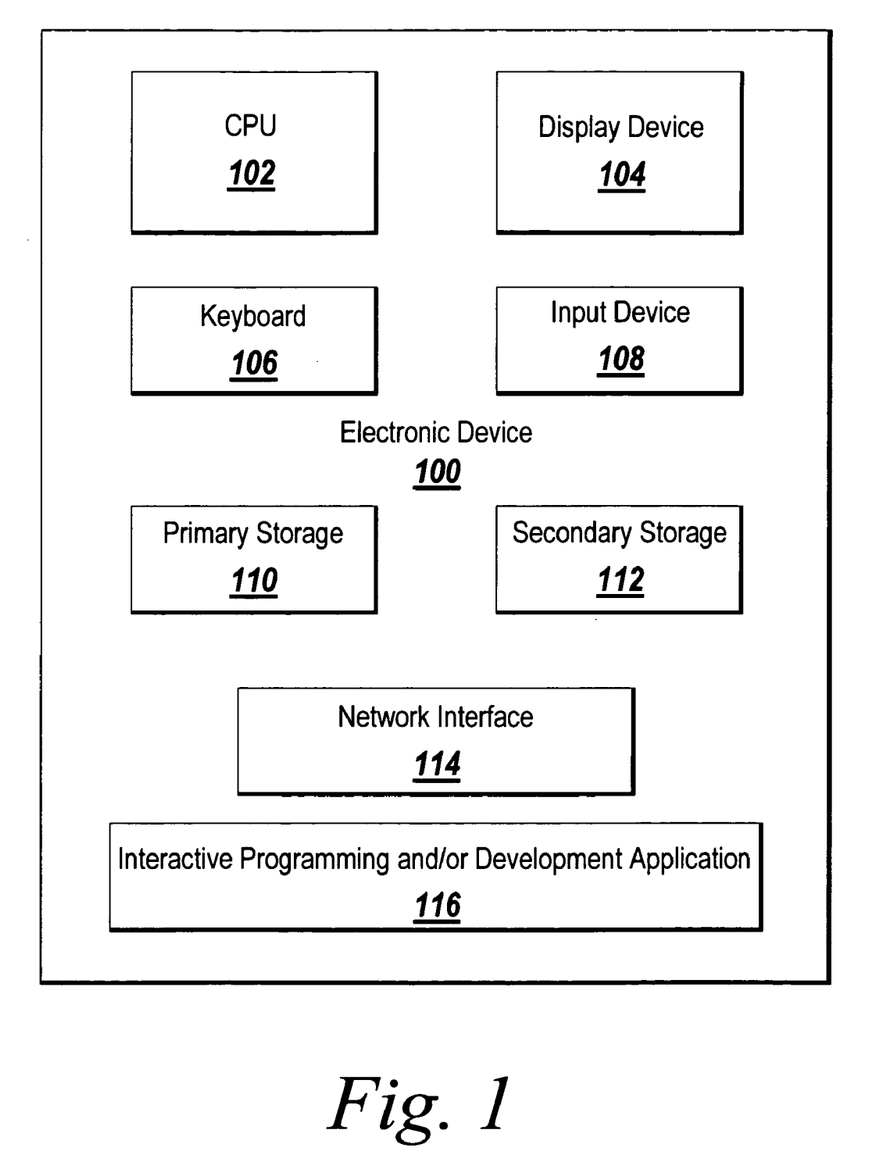
FIG. 1 is a block diagram representation of an electronic device suitable for practicing the illustrative embodiment of the present invention.

FIG. 1 illustrates one example embodiment of an electronic device 100 suitable for practicing the illustrative embodiments of the present invention. The electronic device 100 is representative of a number of different technologies, such as personal computers (PCs), laptop computers, workstations, personal digital assistants (PDAs), Internet appliances, cellular telephones, and the like. In the illustrated embodiment, the electronic device 100 includes a central processing unit (CPU) 102 and a display device 104. The display device 104 enables the electronic device 100 to communicate directly with a user through a visual display. The electronic device 100 further includes a keyboard 106 and an input device such as a mouse 108. Other potential input devices not depicted include but are not limited to a stylus, trackball, joystick, touch pad, touch screen, and the like. The electronic device 100 includes primary storage 110 and secondary storage 112 for storing data and instructions. The storage devices 110 and 112 can include but is not limited to such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 110 and 112. The electronic device 100 can also include a network interface 114 for communicating with one or more electronic devices external to the electronic device 100 depicted. A modem is one form of network interface 114 for establishing a connection with an external electronic device or network. The CPU 102 has either internally, or externally, attached thereto one or more of the aforementioned components. In addition to applications previously mentioned, modeling applications, such as MATLAB® 116, can be installed and operated on the electronic device 100.

It should be noted that the electronic device 100 is merely representative of a structure for implementing the present invention. However, one of ordinary skill in the art will appreciate that the present invention is not limited to implementation on only the described device 100. Other implementations can be utilized, including an implementation based partially or entirely in embedded code, where no user inputs or display devices are necessary. Rather, a processor can communicate directly with another processor or other device.

Figure 2:
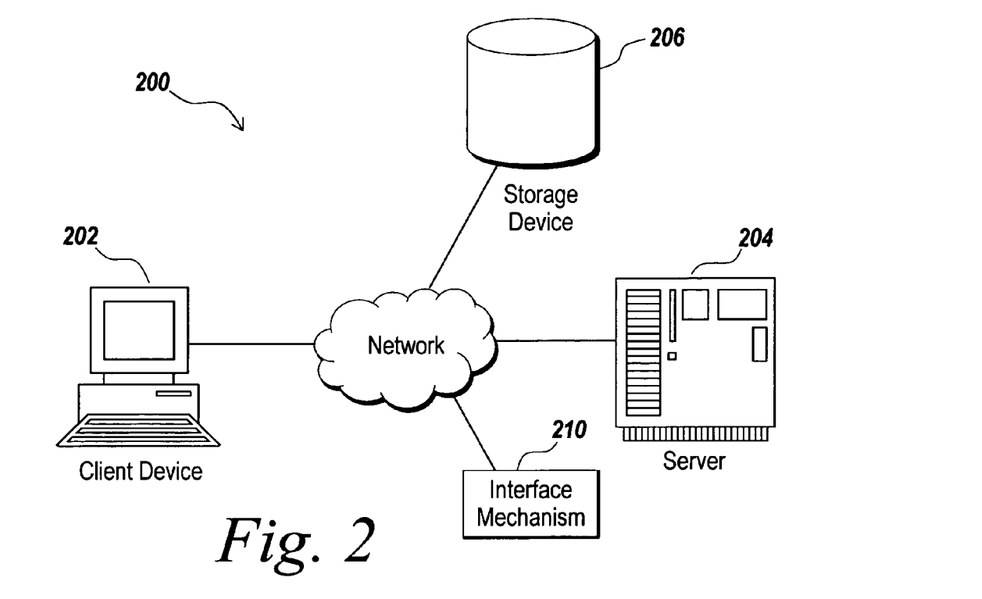
FIG. 2 illustrates a client-server environment suitable for practicing the illustrative embodiment of the present invention wherein a late bound function can be incorporated into an external programming environment.

FIG. 2 is an illustrative embodiment of a distributed network for use in practicing the present invention. The system includes a client device 202 associated with a network 200. Additionally associated with the network is a server device 204, an interface mechanism 210 and a storage device 206. The interface mechanism 210 is capable of integrating late bound function calls within an early bound program environment.

One of the advantages of using late bound function calls, when programming within an object-oriented environment, is that it enables the developer to write code that does not have to be specific about the exact object types of objects that are manipulated. In other words, the late bound function calls can support polymorphism.

Using the interface mechanism 210 of the present invention, during compile time, when an early bound complier encounters a late bound function that exists in a late bound environment, the compiler in the early bound environment, using the interface mechanism 210, allows for runtime execution of the late bound function that exists in the late bound environment. The interface mechanism 210 serves as a kind of proxy for a set of late bound functions, one of which (depending on the types of the inputs at runtime) will be invoked at runtime.

Furthermore, for illustrative purposes the interface mechanism is illustrated as associated with the network 200, but one skilled in the art will readily recognize that the interface mechanism 210 can be additionally associated with the client device 202, the server 204 or some combination thereof. One skilled in the art will further recognize that the presented network embodiment is solely an exemplary sample and the functionality may be divided up in any number of ways over a network. For example, a plurality of clients may be associated with the server, a single client may be associated with several servers, or some combination thereof.

Figure 3:
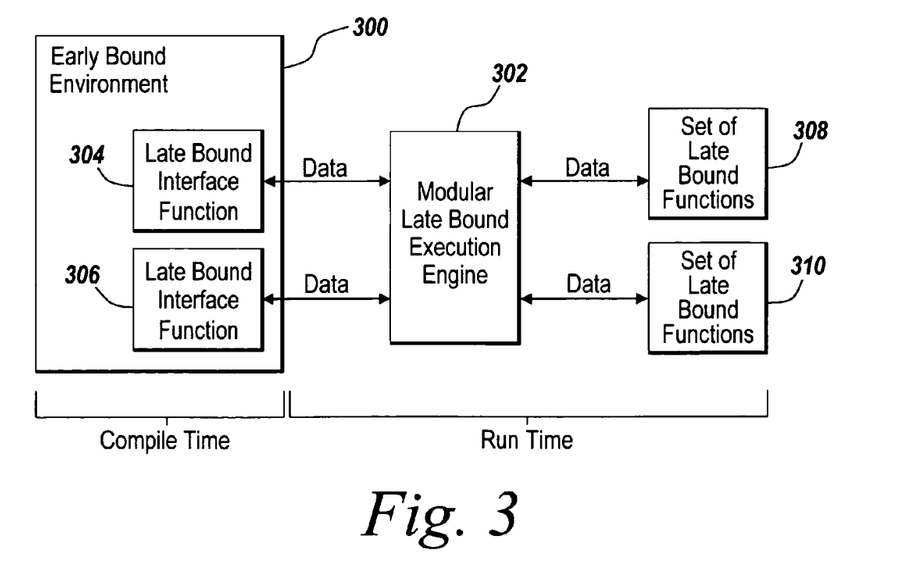
FIG. 3 illustrates components used in practicing the illustrative embodiment of the present invention.

FIG. 3 illustrates components used in practicing the illustrative embodiment of the present invention. The components depicted in the illustrative embodiment provide for the integration of a late bound function into an early bound environment 300. In one example case, the early bound program environment is a Visual Studio® program environment, as offered by Microsoft Corporation, of Redmond, Wash. and the late bound functions are MATLAB® functions. The choice of MATLAB® and Visual Studio® are selected solely for illustrative purposes. Numerous alternative early and late bound languages may be utilized in practicing the present invention.

In the illustrative case, when the late bound functions are MATLAB® functions, the MATLAB® compiler generates late bound interface functions 304 and 306 that are early bound functions that reside within the early bound environment 300. The names and implementations of these interface functions 304 and 306 are completely determined at compile time. At runtime, these interface functions 304 and 306 invoke late bound functions. Specifically, late bound interface function 304 invokes a set of one or more late bound functions 308 via a modular late bound execution engine 302 (described in more detail below). Similarly, late bound interface function 306 invokes a set of one or more late bound functions 310 via the modular late bound execution engine 302. Hence, a mechanism is provided by which an early bound environment 300 can delay function binding until runtime for selected functions.

As can be seen in FIG. 3, the late bound interface functions 304 and 306 may cause more than one late bound function to be executed (see 308 and 310). There may be instances in which a late bound interface function is associated with a single late bound function and other instances wherein multiple late bound functions are associated with a single late bound interface function. Moreover, depending upon the type of input provided to the interface function, each invocation can result in a call to a different late bound function in the associated set.

The interface mechanism, in one embodiment, can be realized through an Application Program Interface (API) having functions that may be called from the early bound application. The API can be used to initiate a call to a function in the late bound environment. For example, an API running in a C program environment can call functions in a MATLAB® late bound environment. In the alternative, the API can be a standalone executable program that does not require a secondary program to operate. From the perspective of an application running in the early bound C language, for example, the function called in the late bound MATLAB® application appears to be a traditional function call, where the function and its arguments are understood and the outputs are passed in a similar manner as any existing function.

The interface mechanism, while described as an API by example, is not limited to use with an API, and in the alternative may be a software or hardware component running in the early or late bound environment. The interface mechanism is capable of automatically expressing the semantics of the late bound programming environment in a format readily recognized by the early bound programming environment at runtime and as set forth prior may take the appropriate form for expressing said semantics.

The modular late bound execution engine 302 provides a mechanism for executing functions that exists in a late bound environment. As these are late bound functions, they are bound at runtime in the late bound environment. In situations where the late bound environment is a MATLAB® environment, the modular late bound execution engine may be a MATLAB® component runtime engine. The MATLAB® component runtime engine is a stand-alone set of shared libraries that enables execution of M-files, MEX-files and other types of MATLAB executable content. With the MATLAB® component runtime engine as a modular execution engine, there is no need to open the MATLAB® computation runtime engine in a new window visible to the user when executing a function in the late bound environment; rather the component runtime engine can execute in the background in a manner that is not visible to the user.

The present invention is not limited to solely a MATLAB® application and MATLAB® component runtime engine, and may be practiced with numerous substitute late bound environments and execution engines.

The modular late bound execution engine 302 is such that following the execution of a late bound interface function call 304 or 306 in the early bound environment 300, the modular late bound execution engine 302 can either remain running or can be terminated. Allowing the modular late bound execution engine 302 to remain running allows for subsequent function execution in the late bound environment for calls from within the early bound environment 300 to occur more quickly, and it is no longer necessary to initiate the module late bound execution engine 302. In the alternative, terminating the modular late bound execution engine 302 after executing late bound functions, controlled from within the early bound environment 300, decreases processor demand and resource allocation, and the resources associated with the modular late bound execution engine 302 are free upon termination of the modular execution engine 300. (THAT EXISTS)

An example is helpful to illustrate operation of the illustrative embodiment. The example is a MATLAB® function from within a late bound program environment (e.g. MATLAB®) that is used to add 10 to any input number. The function is named plus10 and is defined as follows:

```
function s = plus10(x)
s = x + 10;
disp([num2str(x) '+ 10=' num2str(s)]);
```

Set forth below are the source files for a C function library automatically generated by the MATLAB® Compiler from the M file plus10.m that contains the function plus10. The first file listed below is a header file libplus.h. This header file is followed below by the file libplus.c. The function mlfPlus10 an example of an interface function that a C program calls to access the MATLAB® functionality provided by the plus10 function.

Here is the header file:

```
#ifndef_libplus_h
#define_libplus_h 1
#include "mclmcr.h"
#ifdef_cplusplus
extern "C"{
#endif
extern bool libplusInitializeWithHandlers(mclOutputHandlerFcn error_handler,
                                mclOutputHandlerFcn print_handler);
extern bool libplusInitialize(void);
extern void libplusTerminate(void);
extern void mlxPlus10(int nlhs, mxArray *plhs[], int nrhs, mxArray *prhs[ ]);
extern void mlfPlus10(int nargout, mxArray **s, mxArray *x);
#ifdef_cplusplus
}
#endif
#endif
Here is the libplus.c file:
#include <stdio.h>
#include"mclmcr.h"
#include "libplus.h"
#ifdef cplusplus
extern "C" {
#endif
extern const unsigned char_MCC COMPONENT_public_data[ ];
extern const char *_MCC_COMPONENT_name_data
extern const char *_MCC_COMPONENT_root_data
extern const unsigned char_MCC_COMPONENT_session_data[ ];
extern const char *_MCC_COMPONENT_matlabpath_data[ ];
extern const int_MCC_COMPONENT_matlabpath_data _count;
extern const char *_MCC_COMPONENT_mcr_runtime_options[ ];
extern const int_MCC_COMPONENT_mcr_runtime_option_count;
extern const char *_MCC_COMPONENT_mcr_application_options[ ];
extern const int_MCC_COMPONENT_mcr_application_option_count;
#ifdef_cplusplus
}
#endif
static HMCRINSTANCE _mcr_inst = NULL;
static int mclDefaultErrorHandler(const char *s)
{
    return fprintf(stderr, s);
}
static int mclDefaultPrintHandler(const char *s)
{
    return fprintf(stdout, s);
}
bool libplusInitializeWithHandlers(
    mclOutputHandlerFcn error_handler,
    mclOutputHandlerFcn print_handler
)
{
   return (_mcr_inst == NULL ?
        mclInitializeComponentInstance(&_mcr_inst,
                            _MCC_COMPONENT_public_data,
                            _MCC_COMPONENT_name_data,
                            _MCC_COMPONENT_root_data,
                            _MCC_COMPONENT_session_data,
                            _MCC_COMPONENT_matlabpath_data,
                            _MCC_COMPONENT_matlabpath_data_count,
                            _MCC_COMPONENT_mcr_runtime_options,
                            _MCC_COMPONENT_mcr_runtime_option_count,
                            true, NoObjectType, LibTarget,
                            NULL, error_handler, print_handler)
            :true);
}
bool libplusInitialize(void)
{
    return libplusInitializeWithHandlers(mclDefaultErrorHandler,
                            mclDefaultPrintHandler);
}
void libplusTerminate(void)
{
    if (_mcr_inst != NULL)
        mclTerminateInstance(&_mcr_inst);
}
void mlxPlus10(int nlhs, mxArray *plhs[ ], int nrhs, mxArray*prhs[ ])
{
    mclFeval(_mcr_inst, "plus 10", nlhs, plhs, nrhs, prhs);
}
```

-continued

```
void mlfPlus10(int nargout, mxArray **s, mxArray *x)
{
    mclMlfFeval(_mcr_inst, "plusiO", nargout, 1, 1, s, x);
}
```

The calling of the aforementioned interface function mlxPlus10 from within an early bound programming environment, such as C, is illustrated in the following code.

```
#include <stdio.h>
#include "matrix. h"
#include "libplus.h"
void usage(char *name)
{
    printf("Usage: %s integer\n", name);
    printf("\tAdds 10 to the given integer\n");
    exit(-1);
}
int main(int ac, char *av[ ])
{
    mxArray *input = mxCreateDoubleScalar(atoi(av[1]));
    mxArray *output = NULL;
    double result;
    if(ac != 2) usage(av[0]);
    mclInitializeApplication(NULL, 0);
    libplusInitialize( );
    mlxPlus10(1, &output, 1, &input);
    libplusTerminate( );
    result = mxGetScalar(output);
    printf("%s + 10 = %.0f\n", av[1], result);
    mclTerminateApplication( );
    return 0;
}
```

The aforementioned code is written for use in the C programming language, but one skilled in the art will readily recognize that numerous alternative early bound environments exist for practicing the present invention.

As evidenced by the method for calling the late bound function set forth above, the process is both streamlined and simultaneously provides a suitable mechanism for integration of a late bound function into an early bound environment with minimal user interaction. The calling of the original late bound function (plus10.m) appears as the calling of any other ordinary function from within the early bound environment. Furthermore the early bound environment continues to process early bound functions as usual, thereby offering increased function execution speed.

Figure 4:
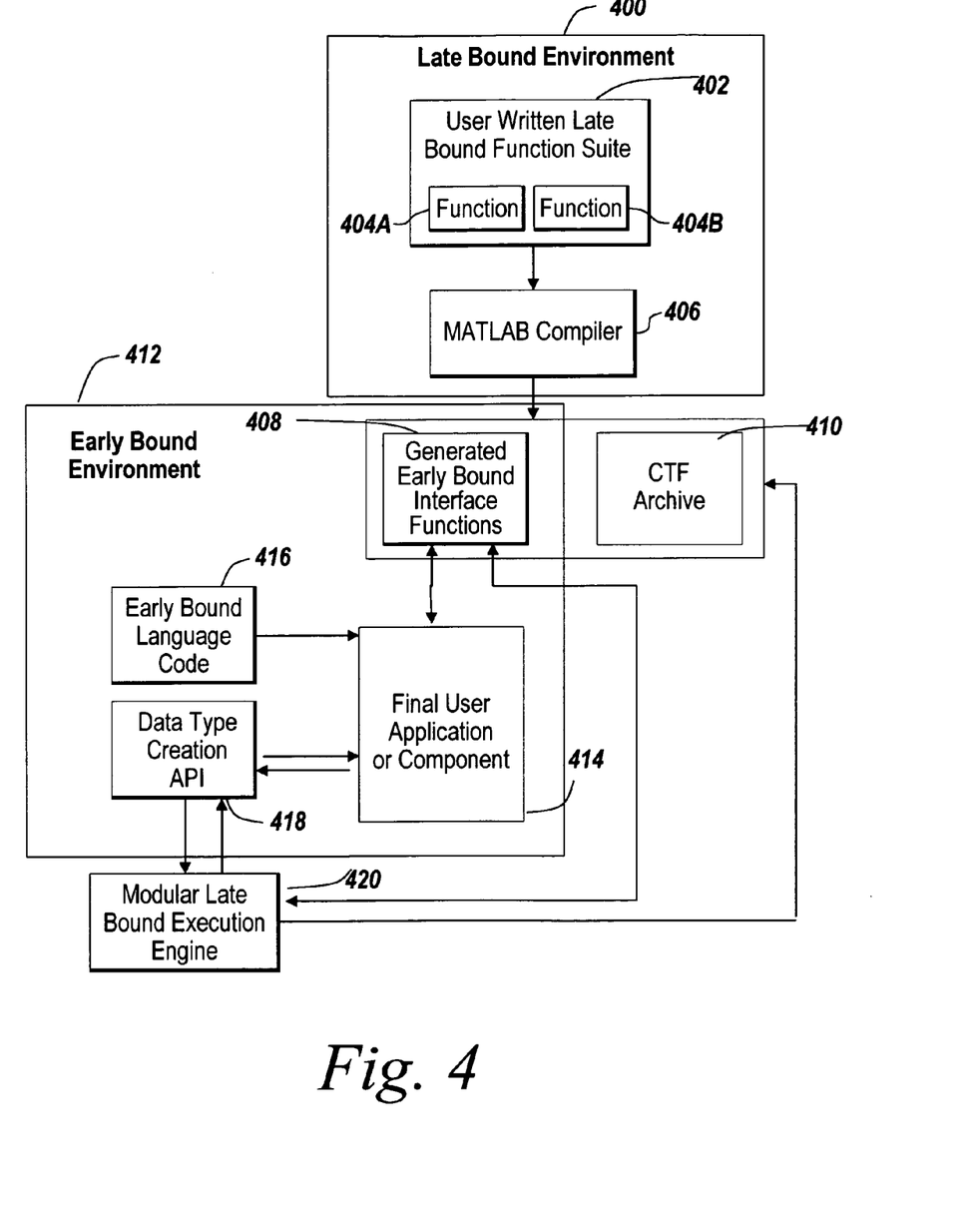
FIG. 4 is a graphical example of the interaction of components in the illustrative embodiment in more detail.

FIG. 4 shows interaction of components in the illustrative embodiment in more detail. Initially, a user develops a late bound application or component using the late bound environment 400. In FIG. 4, this application or component is represented as the user written late bound function suite 402, having late bound functions 404A and 404B. For purposes of illustration, it is supposed that the late bound environment 400 is MATLAB® and that the late bound functions are MATLAB® functions. The user then invokes the MATLAB® compiler 406 to generate a deployable form of his application or component. The MATLAB® Compiler 406 examines the input files to determine the appropriate form for early bound interface files that will be generated to call the late bound functions 404A and 404B. Furthermore, the choice of early bound environment, may additionally influence the form of the generated early bound interface. The MATLAB® Compiler examines the input files to determine dependencies on other late bound functions in the late bound environment 400. The MATLAB® compiler then packages all the necessary late bound functions into a Component Technology File (CTF) archive 410 and generates appropriate early bound interface functions 408. A CTF archive is used to contain all executable content (i.e. M-files or Mex-files) associated with a component. The CTF archives also contain any data files the application requires such that a "snapshot" of all the information required for program execution is generated. The contents of a CTF archive are encrypted.

Figure 5:
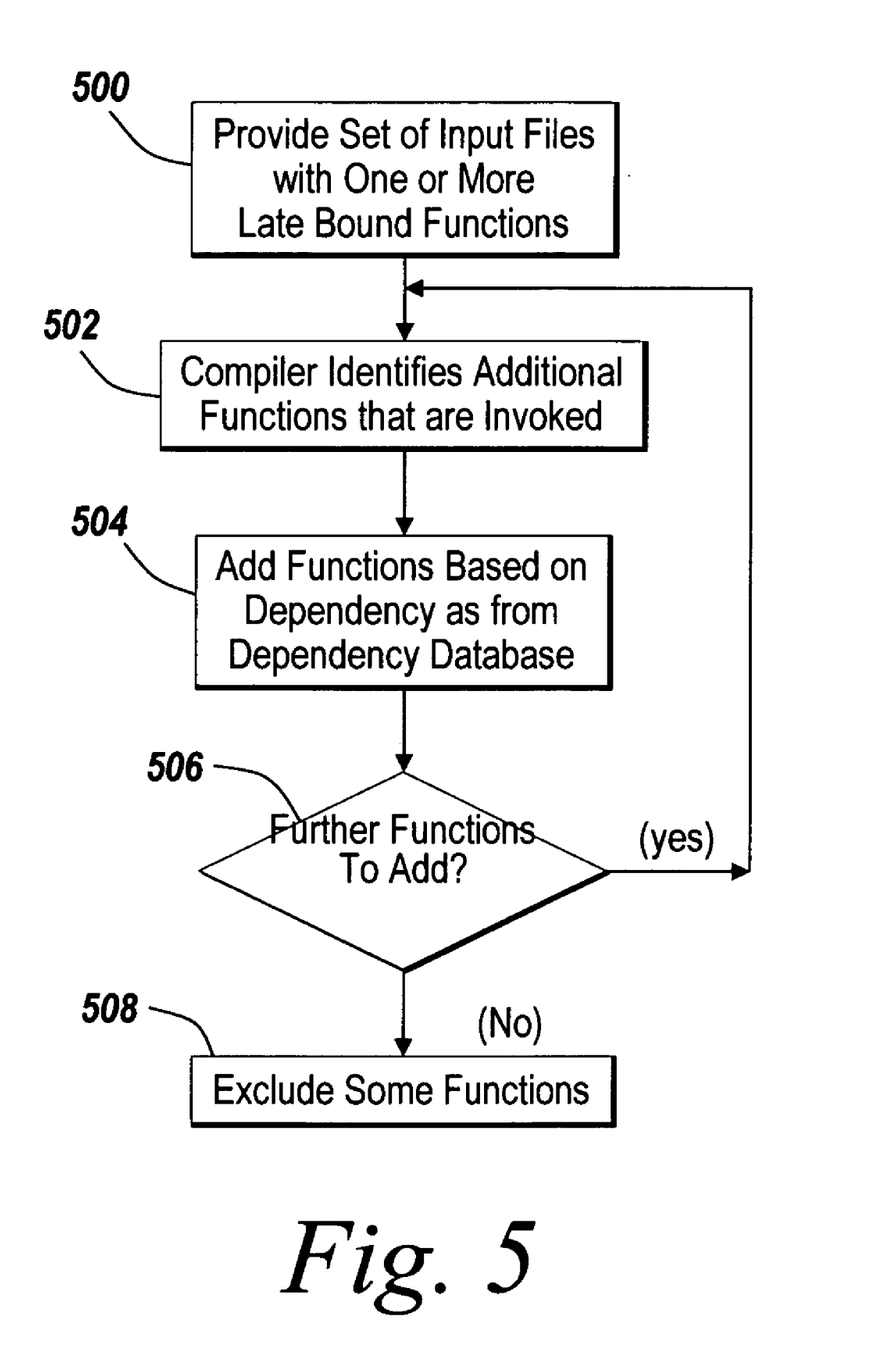
FIG. 5 is a flow chart that illustrates the steps that are performed to determine dependencies on other late bound functions.

FIG. 5 is a flow chart that illustrates the steps that are performed to determine dependencies on other late bound functions. In one embodiment the steps recited in FIG. 5 can be utilized in computing the transitive closure of a function call tree. The process begins with the user providing a set of input files where each input file contains one or more late bound functions (Step 500). The MATLAB® Compiler examines each late bound function that is provided with the set of input files in Step 500 to determine what additional functions are invoked by the late bound functions (Step 502). The Compiler looks at the function call tree that is generated during compilation. Each of the functions identified in Step 502 may have dependencies that are explicitly recorded in a dependency database. This database may indicate, for example, that a particular function requires one or more additional functions in order to operate properly. The dependency analyzer adds these functions to the list of necessary functions (Step 504). Steps 502 and 504 are repeated until there are no further functions added to the list (Step 506). In Step 508, certain functions or groups of functions are explicitly excluded from the list. The exclusion of functions can be motivated by numerous reasons. For example, function exclusion can occur based upon predefined business reasons, wherein particular files or functions are not distributed with a final deployed application for security concerns and protection of intellectual property. Additionally, functions may be excluded to prevent the unintended inclusion of functions known to be unnecessary. These functions occasionally are inadvertently included in the list of necessary functions (step 504) due to inherent imprecision in some dependency determining mechanisms. Finally, the "late bound modular execution engine" typically contains a fixed, base set of late bound functions associated with the late bound modular execution engine. This base set of functions is, by definition, available everywhere the execution engine is installed, therefore, it is unnecessary to include these functions in a deployed application. Using the current exclusion mechanism, a final deployed application may be significantly smaller in size and more readily managed by a user. A user can provide input at step 504 and 508 wherein they explicitly state dependencies and explicitly state exclusions. Additionally, control of the list of necessary function, in whole or in part, may be manipulated by a user.

The output of the dependency analyzer is the final list of late bound functions that comprise the application. These functions are used by the compiler in conjunction with user defined data, such as input data and switches, to determine which interface functions should be generated, as well as the form of these generated functions.

The generated early bound interface functions 408 (FIG. 4) are combined with optional user written early bound language code 416 and the data type creation API 418 to create an early bound application or component 414.

At runtime the final user application or component 414 calls the data type creation API 418 to create data which is late bound environment compatible from data which is contained within the external environment. In the present embodiment the external environment is an early bound programming environment. The data type creation API 418 then identifies this newly created data to the final user application or component 414. The identifying of this data may occur using a "handle" or a "proxy", as understood by one skilled in the art.

The final user application or component 414 then invokes an early bound interface function 408 which in turn calls the modular late bound execution engine 420. Compatible data created from the external environment data, as well as the name of the early bound interface function 408, is then passed to a modular execution engine 420 such that the modular execution engine can combine both the data and the function name (i.e. late binding) to choose the appropriate function from the set contained in the CTF archive 410. The result of the modular late bound execution engine 420 is then returned to the final user application or component 414.

The illustrative embodiment of the present invention provides data types that enable the late bound functions to be called from the early environment. These data types allow the early language to represent the types of data present in the late bound language. These data types may be part of an interface library that is provided to the user.

Further associated with each invocation of the compiler 406 may be an encryption/decryption schema. In one embodiment, upon invocation of the complier a unique encryption/decryption key is generated. This key may be secured using available public key encryption means such as the Advanced Encryption Standard (AES) as used by the United States government. One skilled in the art will readily recognize that numerous alternate encryption/decryption means exist which are readily available for use with the present invention. At runtime, the unique key is decrypted and used in decrypting the required files in the CTF archive. In one embodiment, decryption of files only occurs as the file is needed, thereby preventing the storage of decrypted information on disk.

The use of an encryption/decryption scheme such as this provides for the protection of the code developed by those building applications. As the files used in the CTF archive are encrypted, they may be shared or distributed while simultaneously protecting that which is contained within them. For example, a file containing company trade secrets can be distributed in an encrypted manner such that this trade secret is not revealed to a user. Additionally as the files used in the application are encrypted, an end user cannot readily modify the files such that program execution is affected. Furthermore, as files are encrypted and decrypted based upon a unique key generated by the complier, files used in one application cannot be used in another application. Finally, the tracing of pirated software can be accomplished using the present encryption/decryption mechanisms as each generated application can be analyzed to determine which compiler license key generated the application. Thus, once the compiler license key is known, it is possible to cross reference that license key to a list of licensees to determine the source of the pirated software.

Figure 6:
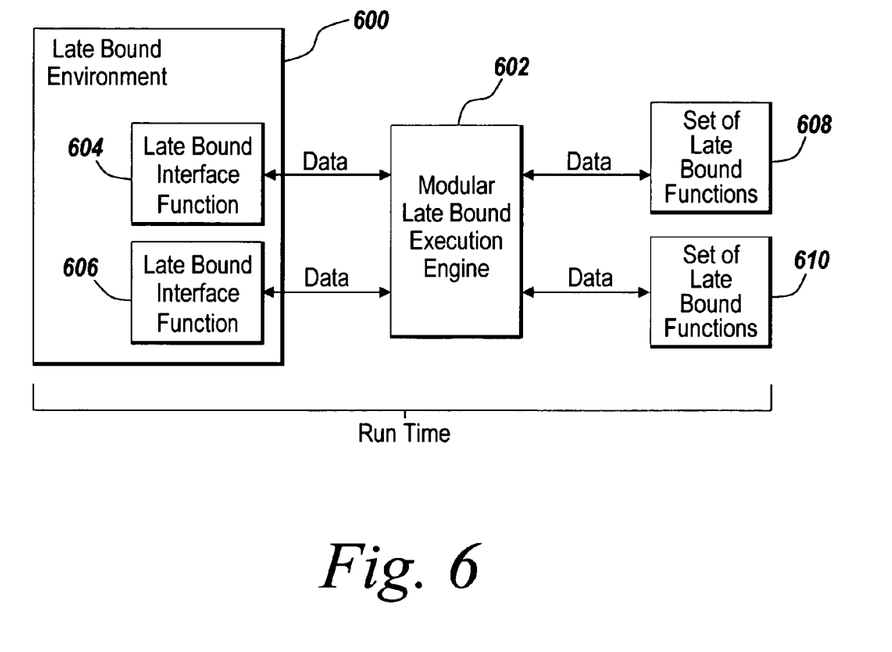
FIG. 6 is an illustrative embodiment of the necessary components for use in integrating a late bound function call into a late bound program environment.

FIG. 6 is an illustrative embodiment of the components necessary for the integration of a late bound function call into a late bound program environment 600. In one example case, the late bound program environment is a LISP program environment, and the late bound functions are MATLAB® functions. Such late bound function and language selections are for illustrative purposes only, as one skilled in the art will readily recognize that numerous alternative late bound functions and languages exist.

In the illustrative case, when the late bound functions are MATLAB® functions, the MATLAB® compiler generates late bound interface functions 604 and 606 that are late bound functions that reside within the late bound environment 600. At runtime, these interface functions 604 and 606 are utilized in invoking late bound functions using a modular late bound execution engine 602. As additionally illustrated in FIG. 6, the late bound interface functions 604 and 606 may cause more than one late bound function to be executed (see 608 and 610). There may be instances in which a late bound interface function is associated with a single late bound function and other instances wherein multiple late bound functions are associated with a single late bound interface function. Additionally, based upon the input type or types provided to the interface function, each invocation can result in a call to a different late bound function in the associated set.

In one embodiment the interface mechanism can be an Application Program Interface (API) having functions that may be called from the late bound application. In the alternative, the API can be a standalone executable program that does not require a secondary program to operate. Additionally, the interface function can be a software or hardware component.

The modular late bound execution engine 602 provides a mechanism for executing functions at runtime, where the functions exist in a late bound environment. In a MATLAB® environment, the modular late bound execution engine may be a MATLAB® component runtime engine capable of execution of M-files, MEX-files and other MATLAB® executable content. The present invention is not limited to solely a MATLAB® application and MATLAB® component runtime engine, and may be practiced with numerous substitute late bound environments and execution engines.

The modular late bound execution engine 602 is such that following the execution of a late bound interface function call 604 or 606 in the late bound environment 600, the modular late bound execution engine 602 can either remain running, such that subsequent function execution in the late bound environment can readily occur, or it can be terminated.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

The invention claimed is:

1. In an electronic device, a method comprising:
  providing a late bound function call of a late bound function, the late bound function call to be executed in an external program environment, the late bound function provided in a late bound program in a late bound environment, the external program environment being an early bound programming environment;
  automatically examining the late bound program to identify a set of one or more dependent late bound functions required by the provided late bound function call;
  automatically generating, using the electronic device, an interface between the set of dependent late bound functions and the external program environment for integrating the set of dependent late bound functions into the external program environment, the interface invoking the late bound function such that the late bound function exists in the late bound environment but the late bound function call is executed within the external program environment; and calling the late bound function from the external program environment, the calling comprising executing the late bound function call from within the early bound programming environment using the interface.

2. The method of claim 1, wherein the electronic device further comprises a late bound executable engine and wherein the late bound executable engine executes the late bound function.

3. The method of claim 2, wherein content of the late bound function is encrypted.

4. The method of claim 3, wherein the content of at least one of the late bound functions in the set of late bound functions is encrypted using a public key encryption means.

5. The method of claim 4, wherein the public key encryption means is an Advanced Encryption Standard (AES) public key encryption means.

6. The method of claim 4 wherein the late bound executable engine decrypts the late bound function in order to execute it.

7. The method of claim 6, wherein the late bound function is decrypted at runtime.

8. The method of claim 2 wherein an encryption/decryption schema provides for a secure sharing of files among a plurality of users.

9. The method of claim 2, wherein an encryption/decryption schema utilizes a unique key generated by a compiler used in executing the late bound function.

10. The method of claim 9, wherein the encryption/decryption schema provides for the tracking of pirated software using the unique key generated by the compiler for use in executing the late bound function.

11. The method of claim 2 further comprising terminating the late bound executable engine following execution of the late bound function in the late bound environment.

12. The method of claim 1, wherein the early bound environment is a C programming environment.

13. The method of claim 1, wherein the early bound environment is a C++ programming environment.

14. The method of claim 1, wherein the early bound environment is a FORTRAN programming environment.

15. The method of claim 1, wherein the late bound environment is a LISP programming environment.

16. The method of claim 1, wherein the late bound environment is a Prolog programming environment.

17. The method of claim 1, wherein the late bound environment is a MATLAB programming environment.

18. The method of claim 1, wherein the interface is an Application Program Interface (API) available to the external program environment.

19. The method of claim 1, wherein the interface is a software component that is executable from within the external program environment.

20. The method of claim 1, wherein the interface is a software application executable from within the external program environment.

21. The method of claim 1, further comprising executing one or more late bound function calls from within the external program environment at runtime.

22. A system comprising:
one or more processors for providing:
an external program environment for executing a late bound function call, wherein the external program environment is an early bound programming environment;
a late bound program environment that executes a late bound function, the late bound function being provided in a late bound program in the late bound program environment, and the late bound program being examined automatically to identify a set of one or more dependent late bound functions required by the late bound function; and
an interface between the set of dependent late bound functions and the external program environment for integrating the set of dependent late bound functions into the external program environment, the interface invoking the late bound function such that the late bound function exists in the late bound environment but the late bound function call is executed within the early bound program environment, the interface automatically expressing semantics of the late bound program environment in a format compatible with the early bound program environment so that the late bound function may be called from the external program environment.

23. The system of claim 22, wherein the late bound program environment contains a modular execution engine.

24. The system of claim 23, wherein the modular execution engine executes the function calls within the late bound program environment from within the external program environment.

25. The system of claim 24, wherein the late bound execution engine is terminated following an execution of the late bound function in the late bound program environment.

26. The system of claim 22, wherein the early bound program environment is a C programming environment.

27. The system of claim 22, wherein the early bound environment is a C++ programming environment.

28. The system of claim 22, wherein the early bound environment is a FORTRAN programming environment.

29. The system of claim 22, wherein the early bound environment is a Visual Basic programming environment.

30. The system of claim 22, wherein the late bound environment is a LISP programming environment.

31. The system of claim 22, wherein the late bound environment is a Prolog programming environment.

32. The system of claim 22, wherein the late bound environment is a MATLAB programming environment.

33. The system of claim 22, wherein the interface is an Application Program Interface (API) running in the early bound program environment.

34. The system of claim 33 wherein the API is utilized in calling a function in the late bound program environment from within the external program environment.

35. The system of claim 22, wherein the interface is a software component that is executable from within the external program environment.

36. The system of claim 22, wherein the interface expresses semantics of the late bound program environment in the external program environment at runtime.

37. In a network, a method of comprising:
providing a server capable of executing a late bound program environment and an external program environment for communicating with a client device over the network,
providing a late bound function call of a late bound function, the late bound function call to be executed in the external program environment, the late bound function provided in a late bound program in the late bound environment, the external program environment being an early bound programming environment;

automatically examining the late bound program to identify a set of one or more dependent late bound functions required by the provided late bound function call;

automatically generating, using an electronic device, an interface between the set of dependent late bound functions and the external program environment for integrating the set of dependent late bound functions into the external program environment, the interface invoking the late bound function such that the late bound function exists in the late bound environment but the late bound function call is executed within the external program environment, the interface providing a mechanism for automatically integrating the late bound program into the early bound program environment; and calling the late bound function from the external program environment, the calling comprising executing the late bound function call from within the early bound programming environment using the interface.

38. The method of claim 37, wherein generating the interface is performed via the client device.

39. The method of claim 37, wherein generating the interface is performed via the server.

40. The method of claim 37, wherein content of the late bound function is encrypted.

41. The method of claim 37 wherein the late bound execution engine decrypts the content of the late bound function in order to execute it.

42. A system comprising:

a distribution server comprising one or more processors for providing information to a client device, an external program environment for executing a late bound function call of a late bound function, the external program environment being an early bound programming environment;

a late bound program environment that executes the late bound function;

the late bound function being provided in a late bound program in the late bound program environment and the late bound program being examined automatically to identify a set of one or more dependent late bound functions required by the provided late bound function call; and an interface mechanism between the set of dependent late bound functions and the external program environment for integrating the set of dependent late bound into the external program environment, the interface invoking the late bound function such that the late bound function exists in the late bound environment the late bound function call is executed within the early bound program environment, so that the late bound function may be called from the external program environment.

43. The system of claim 42, wherein the client device can integrate late bound function calls within the external program environment using the provided interface mechanism.

44. The system of claim 42, wherein content of the late bound function is encrypted.

45. The system of claim 42 wherein the late bound execution engine decrypts the content of the late bound function in order to execute it.

46. The system of claim 42, wherein the client device is an electronic device including memory for storing computer program instructions and data, and a processor for executing the stored computer program instructions.

47. A non-transitory storage device holding executable instructions, wherein that storage device provides an environment communicating with a selected external environment using an electronic device, the instructions comprising instructions for:

providing a late bound function call of a late bound function, the late bond function call to be executed in an external program environment, the late bound function provided in a late bound program in a late bound environment, the external program environment being an early bound programming environment;

automatically examining the late bound program to identify a set of one or more dependent late bound functions required by the provided late bound function call;

automatically generating, using the electronic device, an interface between the set of dependent late bound functions and the external program environment for integrating the set of dependent late bound functions into the external program environment, the interface invoking the late bound function such that the late bound function exists in the late bound environment but the late bound function call is executed within the external program environment; and calling the late bound function from the external program environment, the calling comprising executing the late bound function call from within the early bound programming environment using the interface.

48. The storage device of claim 47, wherein the late bound program environment contains a modular execution engine.

49. The storage device of claim 48, wherein the interface mechanism expresses the semantics of the late bound program environment in the external program environment at runtime.

50. The storage device of claim 47, wherein the late bound program environment remains running after an execution of a late bound function call in the late bound program environment.

51. The storage device of claim 47, wherein the late bound execution engine is terminated following an execution of a late bound function call in the late bound program environment.

52. The storage device of claim 47, wherein the interface mechanism is an Application Program Interface (API) running in the external environment.

53. The storage device of claim 47, wherein the API is utilized in calling a function in the late bound program environment from within the external program environment.

54. The storage device of claim 47, wherein the interface mechanism is a software component that is executable from within an external program environment.

* * * * *